(12) United States Patent
Michaels et al.

(10) Patent No.: US 8,744,271 B2
(45) Date of Patent: Jun. 3, 2014

(54) METHOD FOR CONTROLLING TERAHERTZ ELECTROMAGNETIC CARRIER WAVES

(75) Inventors: Ralph Michaels, Bergisch Gladbach (DE); Hans Joachim Einsiedler, Berlin (DE); Gerhard Kadel, Darmstadt (DE); Josef Kraus, Dieburg (DE); Klaus Milczewsky, Seeheim-Jugenheim (DE); Michael Kern, Berlin (DE); Karsten Buse, Bonn (DE); Ingo Breunig, Bonn (DE); Rosita Sowade, Bonn (DE); Jens Kiessling, Bonn (DE); Bastian Knabe, Bonn (DE)

(73) Assignee: Deutsche Telekom AG, Bonn (DE)

( * ) Notice: Subject to any disclaimer, the term of this patent is extended or adjusted under 35 U.S.C. 154(b) by 794 days.

(21) Appl. No.: 12/993,883

(22) PCT Filed: May 5, 2009

(86) PCT No.: PCT/DE2009/000639
§ 371 (c)(1),
(2), (4) Date: Feb. 7, 2011

(87) PCT Pub. No.: WO2009/140941
PCT Pub. Date: Nov. 26, 2009

(65) Prior Publication Data
US 2011/0187975 A1 Aug. 4, 2011

(30) Foreign Application Priority Data
May 23, 2008 (DE) .......................... 10 2008 024 795

(51) Int. Cl.
*H04B 10/00* (2013.01)

(52) U.S. Cl.
USPC ............................ 398/172; 332/103; 332/102

(58) Field of Classification Search
USPC ................................... 398/172; 332/103, 106
See application file for complete search history.

(56) References Cited

U.S. PATENT DOCUMENTS

| 4,090,204 A | 5/1978 | Farhat |
| 5,059,008 A | 10/1991 | Flood |
| 6,618,186 B2 | 9/2003 | Kaeriyama |
| 7,446,929 B1 * | 11/2008 | Jayaraman et al. ............ 359/299 |
| 2004/0051929 A1 * | 3/2004 | Sampsell et al. .............. 359/247 |
| 2005/0024359 A1 | 2/2005 | Pan |

(Continued)

FOREIGN PATENT DOCUMENTS

| DE | 3131227 A1 | 2/1983 |
| DE | 102007007378 B3 | 4/2008 |
| EP | 1798570 A2 | 6/2007 |
| WO | WO 2006023195 A2 | 3/2006 |

OTHER PUBLICATIONS

International Search Report for PCT/DE2009/000639, mailed on Sep. 18, 2009.

*Primary Examiner* — Christine Sung
(74) *Attorney, Agent, or Firm* — Leydig, Voit & Mayer, Ltd.

(57) ABSTRACT

A method for influencing electromagnetic radiation in a frequency range between 0.1 and 10 terahertz includes providing a planar modulator having a matrix of at least 10×10 individual, active planar elements. Each planar element has a diameter between 5 μm and 100 μm. The planar elements are individually controlled using a central control unit such that each planar element assumes a respective one of at least two states in accordance with the control so as to influence the radiation.

17 Claims, 2 Drawing Sheets

(56) References Cited

U.S. PATENT DOCUMENTS

| | | |
|---|---|---|
| 2006/0017999 A1 | 1/2006 | Vaughan |
| 2008/0079916 A1* | 4/2008 | Noba .......................... 353/119 |
| 2008/0197286 A1 | 8/2008 | Kasai |
| 2009/0262766 A1* | 10/2009 | Chen et al. ...................... 372/26 |
| 2011/0098033 A1* | 4/2011 | Britz et al. .................. 455/422.1 |
| 2011/0303824 A1* | 12/2011 | Grbic et al. ................ 250/208.1 |
| 2012/0099856 A1* | 4/2012 | Britz et al. ...................... 398/26 |
| 2013/0128132 A1* | 5/2013 | Kholodnyak et al. ............. 349/1 |

\* cited by examiner

METHOD FOR CONTROLLING TERAHERTZ ELECTROMAGNETIC CARRIER WAVES

CROSS-REFERENCE TO RELATED APPLICATIONS

This application is a U.S. National Phase application under 35 U.S.C. §371 of International Application No. PCT/DE2009/000639, filed on May 5, 2009, and claims benefit to German Patent Application No. DE 10 2008 024 795.2, filed on May 23, 2008. The International Application was published in German on Nov. 26, 2009 as WO 2009/140941 under PCT Article 21 (2).

FIELD

The present invention relates to a method for influencing, in particular deflecting and/or focusing, electromagnetic radiation in the frequency range between 0.1 and 10 terahertz as well as a system for implementing the method.

BACKGROUND

Since approximately 100 years ago, when first technologies for wireless data transmission began to be employed, the bandwidth available for transmission has grown continuously. In order to be able to satisfy the continually increasing demand, waves in the terahertz range will be used in the future as carriers with especially high carrier frequencies in order to achieve data transmission rates in the range of 10 Gbit/s and higher with these waves.

Such terahertz waves can be generated by means of ultrafast electronic circuits or by means of optical methods. Since the electronic methods are limited in their speed on account of the lifetimes of free electrons and holes, however, these methods operate only inefficiently, if at all, at frequencies above 100 GHz. In contrast, the prior art optical methods for generating terahertz waves mostly employ higher frequencies that are then reduced by frequency mixing. Thus, in the meantime methods have become known with which terahertz waves are generated with high efficiency by difference frequency generation of two light waves in the infrared, visible, or ultraviolet spectral range.

At the present time, however, it is still relatively difficult to control the propagation of terahertz waves. The mirrors and lenses required for control are highly complex and can only be produced at correspondingly high expense if they are to be electronically controllable.

SUMMARY

In an embodiment, the present invention provides a method for influencing electromagnetic radiation in a frequency range between 0.1 and 10 terahertz. The method includes providing a planar modulator having a matrix of at least 10×10 individual, active planar elements. Each planar element has a diameter between 5 μm and 100 μm. The planar elements are individually controlled using a central control unit such that each planar element assumes a respective one of at least two states in accordance with the control so as to influence the radiation.

BRIEF DESCRIPTION OF THE DRAWINGS

The present invention is explained below with reference to FIGS. 1 through 3. Other features and advantages of various embodiments of the ball switch according to the present invention will become apparent by reading the following detailed description with reference to the attached drawings which illustrate the following.

DETAILED DESCRIPTION

Figure 1:
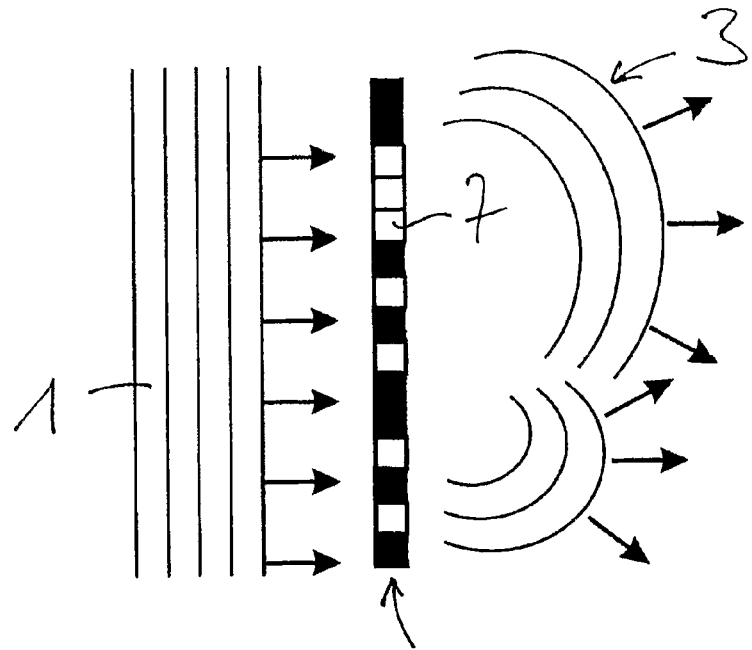
FIG. 1 the schematic of a hologram in transmission geometry.

In an embodiment, the present invention provides a method with which the propagation of terahertz waves can be controlled in a simple and economical way. In a further embodiment, the present invention provides a system for implementing the method.

According to an embodiment of the present invention, the concept of digital holography is extended to the terahertz range. To this end, a planar modulator is used that has, at least on its surface, an arrangement of a plurality of individual, active planar elements. Such an arrangement should have at least a matrix of 10×10 planar elements, and in particular even more than 100×100 planar elements. In this context, "active" means that electromagnetic radiation in the frequency range between 0.1 and 10 terahertz can be intentionally influenced with these planar elements, wherein the influence is based primarily on bending effects, which is to say a local change in the amplitude and/or the phase of the terahertz wave.

The matrix of the individually adjustable planar elements forms essentially a hologram with which any desired wave fronts can be produced by amplitude and/or phase modulation through bending of the incident wave. Since the amplitude or phase pattern at which the bending takes place, which is to say the hologram, is generated not photographically, but instead with the aid of electronically controlled processes, the inventive procedure corresponds to "digital holography," with which, in contrast to photographic holography, changeable holograms can be produced.

In order to be able to achieve the desired bending effects, the planar elements must have a size corresponding to the wavelength of the radiation. In particular, they should be smaller than approximately one quarter of the wavelength of the terahertz wave to be influenced. From this relationship, it follows that the planar elements should have a diameter on the order of magnitude between approximately 5 μm and 100 μm. A preferred order of magnitude is approximately 10 μm. In addition, a concept essential to the invention is that the individual planar elements can be altered in terms of their property that influences the radiation through individual control by means of an appropriate control unit. By means of this control, the planar elements should be adjustable to at least one of at least two states, or even of a complete spectrum of different states. In this design, it is advantageous for the control to be electronic.

The bending effects can be brought about in two fundamentally different ways: On the one hand, the radiation can pass through the planar elements of the modulator ("transmission geometry"). The states of the planar elements can then be brought about, in particular, by changes in refractive index and/or transparency. Bending maxima with different planar and spatial extents and directions can be produced as a function of the pattern of planar elements that is produced on the modulator.

On the other hand, the radiation can be reflected at the individual planar elements of the modulator ("reflection geometry"). The incident wave can also be modulated in phase and/or amplitude with this arrangement. For phase modulation, the positions of the local mirrors can be moved forward or backward so that the optical path changes, for example. For amplitude modulation, the mirrors can also simply be folded away.

When a mirror is displaced "to the rear," then the path from the incident to the reflected wave is lengthened by this microscopic height modulation. The phase of the wave is changed in this way. The incident wave encounters a different "depth" (path length) depending on the location on the hologram. This results in phase modulation, and thus bending, and ultimately in generation of the holographic image.

The shape and direction of propagation of the terahertz waves can be controlled conveniently with the inventive type of modulation. This opens up a variety of new applications for terahertz waves, particularly in wireless short-range telecommunications with transmission bandwidths of greater than 1 Gbit/s or also in scanning of objects for quality control and security screening.

A further embodiment of the present invention provides for the technical implementation of the method. In this regard, components, in particular conventional displays, that are used for other applications per se are used according to the invention as light modulators. Pixel liquid-crystal modulators and matrix micro-mirror arrays ("mirror arrays," so-called "MEMS," micro-electro-mechanical systems) can be used to particular advantage. Lastly, metals are especially effective at reflecting not just visible light, but also the terahertz waves under discussion here. It is also possible to use displays which, instead of using large-area electrodes that would completely absorb the terahertz waves, control the individual planar elements with small wires.

These light modulators lend themselves especially well to use for digital holography in the frequency range between 0.1 and 10 terahertz, since they have typical pixel sizes of 10 μm×10 μm and thus produce bending of radiation with wavelengths between 30 μm and 3000 μm. A terahertz wave that passes through a display with such characteristics or is reflected by such a display is subjected to the bending. Since the bending structure on the display can be adjusted by individually driving the pixels, the radiation can be deflected or focused in any desired angular range.

In advantageous fashion, systems consisting of transmitters and receivers are equipped with means by which the optimal direction of the radiated terahertz wave or the optimal deflection of the incident terahertz wave can be determined. Such means can communicate, for example by simple radio communication, and inform one another of their respective relative positions.

In addition, a sensor can be used to measure the orientation of a mobile device whose display is to be used as a modulator. When it is known how the terahertz light is to be shaped optimally, whether at emission or at reception, then a suitable modulation pattern can be chosen by accessing a "library" containing standard patterns which implement, for example, gratings or Fresnel lenses, and can be impressed on the display or on a part of the display by means of the control.

In another telecommunications application, a transmitter can be equipped with an inventive digital holographic modulator, and by generating different gratings, can transmit the beam specifically to one or more receivers, and can also track the direction if applicable in the case of moving receivers. Using such a digital holographic modulator in the security field, a terahertz wave can be raster-scanned over an object to be examined, or can even be focused thereon when especially small objects are to be examined. To this end, patterns known from optics as "Fresnel lenses" are reproduced on the digital modulator. In another application, wide scattering of a terahertz wave can also be produced by fine-scale random patterns when a large solid angle range is to be provided with terahertz light.

As shown in FIG. 1, the front of an incident terahertz wave 1 strikes a spatial modulator 2 implemented as a hologram. The modulator has a matrix of at least 10×10 individual, active planar elements 7, wherein each planar element has a diameter of approximately 10 μm. Each planar element is controlled by a central control unit and assumes one of at least two states in accordance with the control.

The terahertz wave 1 is bent at the modulator 2 and converted into the new terahertz wave 3. In this case, bending of the terahertz light in transmission is involved. In this regard, distinctions are drawn between amplitude and phase modulators, and also between "thin" and "thick" modulators, wherein "thick" modulators only bend the light when the Bragg condition is met. In this regard, modulators are thick when their thickness is significantly larger than the wavelength of the terahertz radiation.

Figure 2:
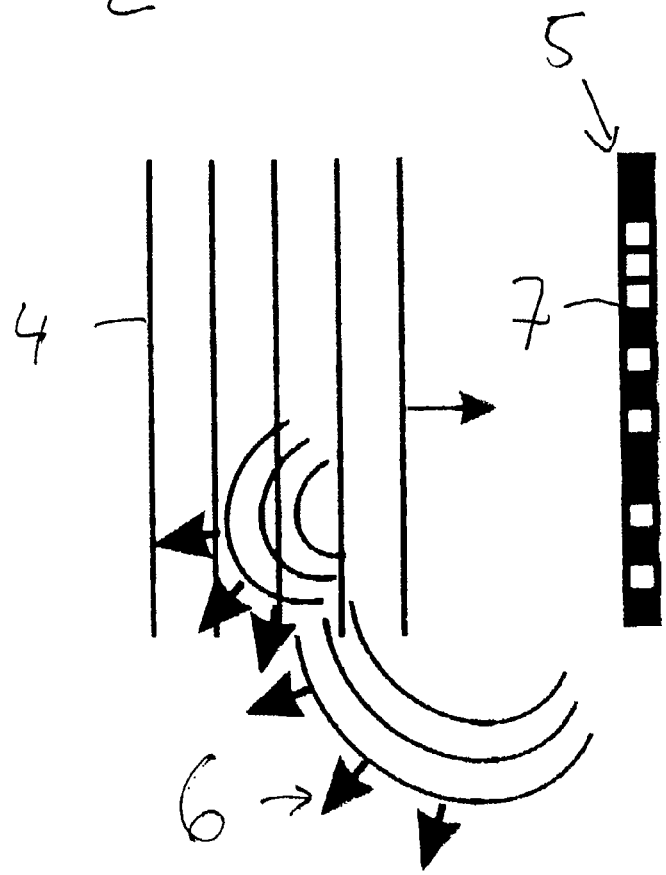
FIG. 2 the schematic of a hologram in reflection geometry.

As shown in FIG. 2, the bending of an incident terahertz wave 4 takes place in reflection at the modulator 5. Accordingly, the reflected wave 6 propagates in the opposite direction.

Figure 3:
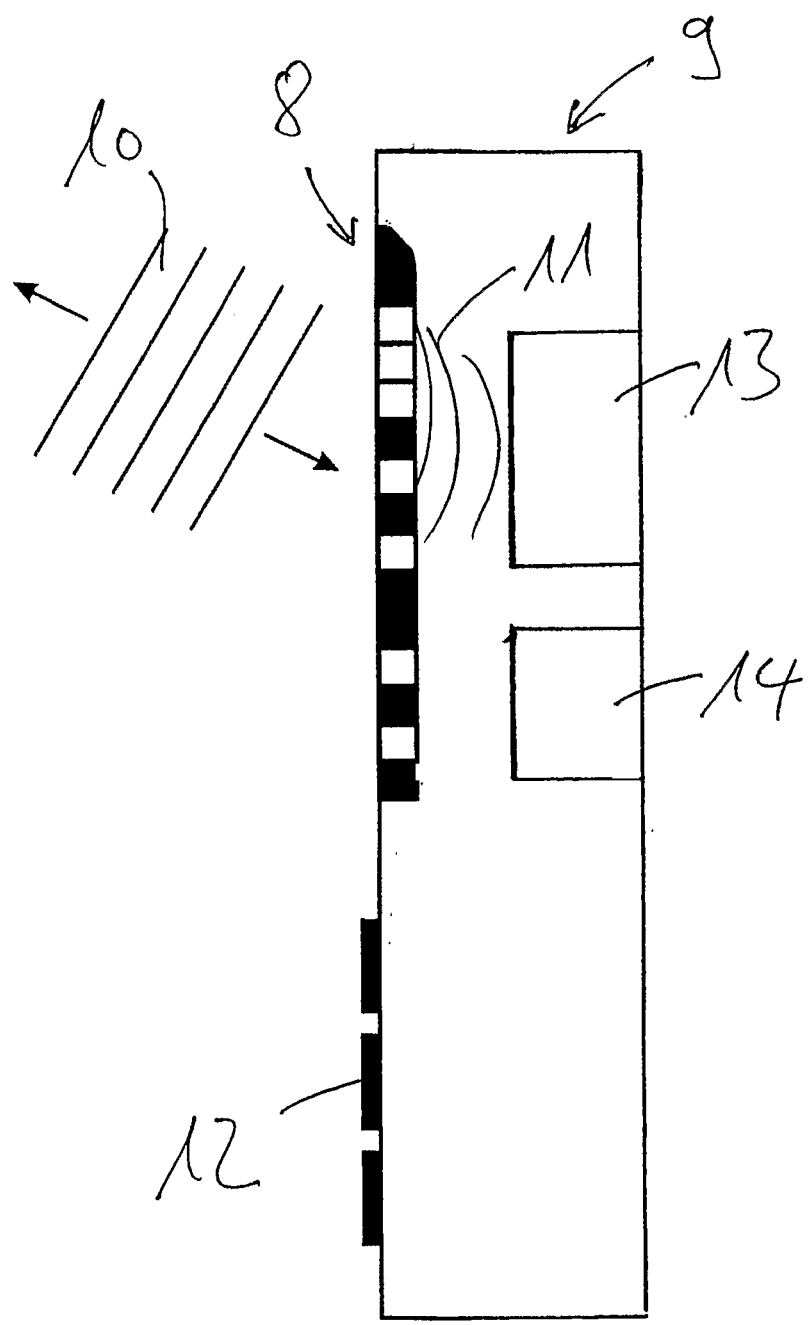
FIG. 3 a display as hologram.

In the embodiment shown in FIG. 3, a display 8 of a mobile telephone 9 is used as a modulator. Information can be displayed thereon, as is usual. In addition, however, a portion of the display 8 or the entire display 8 can be used to shape the incident terahertz wave 10 by bending in the transmission geometry into the wave 11, which is focused on a detector 13. To this end, a suitable pattern is reproduced on the display 8 in order to produce the desired focusing effect. In this case, the display, as a digital hologram, images the THz signal onto the detector inside the device with a short focal length. A THz signal can thus be received and processed with the mobile telephone. The electronics of the mobile telephone for controlling the display constitutes the central control unit, which produces the appropriate pattern on the display 8. The mobile telephone has corresponding buttons 12. An adjustable hologram for the terahertz radiation is produced by switching the planar elements of the display composed of the pixels.

Moreover, a transmitter 14 for terahertz waves can be provided in the mobile telephone 9. With this transmitter, a terahertz wave can be generated and transmitted by specific bending at the display 8. With the aid of the digital hologram, the point source (spherical wave) generated in the mobile telephone 9 becomes a planar wave (directive wave) that propagates in the direction of the receiving station.

Such a device can be used to transmit data over short distances with high bandwidth. This permits directional radio connections with terahertz light, resulting in greater ranges than with isotropic radiation. Moreover, with a mobile telephone thus equipped, a terahertz beam can be raster-scanned over objects or focused onto individual locations on an object.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

What is claimed is:

1. A method for influencing electromagnetic radiation in a frequency range between 0.1 and 10 terahertz, the method comprising:

providing a planar modulator having a matrix of at least 10×10 individual active planar elements, wherein each planar element has a diameter between 5 μm and 100 μm; and controlling the planar elements individually using a central control unit such that each planar element assumes a respective one of at least two states in accordance with the control so as to influence the radiation;

wherein the modulator is a liquid-crystal modulator and the planar elements comprise liquid crystals; and wherein controlling the planar elements comprises changing orientation of the liquid crystals so as to adjust at least one of a refractive index and an absorption for the radiation.

2. The method according to claim 1, wherein the controlling is performed so as to at least one of deflect and focus the radiation.

3. The method according to claim 1, wherein each planar elements has a diameter of 10 μm.

4. The method according to claim 1, wherein the radiation passes through the planar elements of the modulator and at least one of transmission and refractive index of the planar elements is electronically controlled.

5. The method according to claim 1, wherein the radiation is reflected at the planar elements of the modulator and at least one of a position and a reflectivity of the planar elements is controlled.

6. The method according to claim 1, wherein an adjustable hologram for the terahertz radiation is provided by switching the planar elements of the modulator.

7. The method according to claim 1, wherein the electromagnetic radiation is a terahertz beam, and wherein the controlling is performed so as to direct the terahertz beam in a wireless communications system from a transmitter to a receiver.

8. The method according to claim 7, wherein the terahertz beam is dynamically tracked.

9. The method according to claim 1, wherein the electromagnetic radiation is a terahertz beam, and wherein the controlling is performed so as to at least one of raster-scan the terahertz beam over objects and focus the terahertz beam onto individual locations on an object.

10. The method according to claim 1, further comprising selecting standard patterns from a library of suitable modulation patterns and impressing the standard patterns on the modulator.

11. The method according to claim 10, wherein the standard patterns include at least one of gratings and Fresnel lenses, and wherein the standard patterns are impressed on at least a portion of a display.

12. A device for influencing electromagnetic radiation in a frequency range between 0.1 and 10 terahertz, the device comprising:

a planar modulator having a matrix of at least 10×10 individual active planar elements, wherein each planar element has a diameter between 5 μm and 100 μm; and a central control unit configured to individually control each of the planar elements such that each planar element is adapted to assume a respective state so as to influence the radiation;

wherein the modulator is a liquid-crystal modulator and the planar elements comprise liquid crystals such that at least one of a refractive index and an absorption for terahertz radiation is adjustable by a change in orientation of the liquid crystals.

13. The device according to claim 12, wherein each planar elements has a diameter of 10 μm.

14. The device according to claim 12, wherein each planar element is switchable between at least two defined states.

15. The device according to claim 12, wherein the planar elements form a mirror array.

16. The device according to claim 12, wherein the modulator is included in a display of at least one of a mobile telephone, a mobile computer and a digital projector.

17. The device according to claim 12, further comprising thin wires connected to the planar elements, the thin wires occupying an area of the device such that less than 80 percent of incident terahertz waves are absorbed by conductive electrodes of the thin wires.

\* \* \* \* \*